Aug. 17, 1965 J. E. KRYNSKI 3,200,951
FILTER
Filed Nov. 9, 1962 2 Sheets-Sheet 1

INVENTOR.
JOHN E. KRYNSKI
BY
Robertson any Smythe
ATTORNEYS

Aug. 17, 1965  J. E. KRYNSKI  3,200,951
FILTER
Filed Nov. 9, 1962  2 Sheets-Sheet 2

INVENTOR.
JOHN E. KRYNSKI
BY
Robertson & Smythe
ATTORNEYS.

United States Patent Office 3,200,951
Patented Aug. 17, 1965

3,200,951
FILTER
John E. Krynski, East Moline, Ill., assignor to Ametek, Inc., New York, N.Y., a corporation of Delaware
Filed Nov. 9, 1962, Ser. No. 236,667
2 Claims. (Cl. 210—404)

This invention relates to drum type filters and particularly to an improved drum filter made substantially entirely of plastic.

The principal object of the invention is to provide a drum filter composed substantially entirely of a material that will be substantially chemically inert and possess a high resistance to most acids, alkalies, detergents, oils and solvents.

Another object of the invention is to provide such a filter in which the drum portion is formed from two opposing halves.

Still another object of the invention is to provide such a filter in which resilient caulking rings are integrally cast within the periphery of the drum halves.

Another object of the invention is to provide such a filter in which the drum head of each half is integral with its peripheral shell.

Still another object of the invention is to provide such a drum filter in which axially extending, peripherally spaced, machined or extruded plastic division strips are bonded to the shell forming shallow pockets about its periphery.

Another object of the invention is to provide such a filter in which the division strips include caulking grooves that are aligned with caulking grooves that extend across the peripherally extending caulking grooves in the drum.

In one aspect of the invention, a drum type filter may be formed from two half portions, each comprising a hollow cylindrical portion having one of its ends closed by a head. The half portions may be formed of plastic such as a dispersion of polyvinyl chloride resin in a suitable liquid plasticizer. Epoxy or polyester resins with glass or other reinforcing may be used.

Preferably, a disk of plastic material of the proper diameter and thickness has its periphery roughened and inserted into and located at the bottom of a mold having one end open and the other end closed. An internal peripheral groove is provided at the juncture of the end of the mold adjacent the closed end, and it may include a peripheral tongue extending radially inwardly about midway of the width of the peripheral groove. A grooved, flexible caulking ring may be supported on the tongue.

The mold, at its open end, may include an internal flange or ring equal to or greater than the desired thickness of the shell, and the mold may be arranged for rotation about a horizontal axis.

In another aspect of the invention, with the end plastic disk in place, a plastic material may be introduced through the open end of the mold while the latter is rapidly rotating about its horizontal axis, and the mold may be subjected to a predetermined temperature. The centrifugal force applied to the plastic material causes it to be distributed in a uniform thickness without bubbles over the inner periphery of the mold, filling the groove at the juncture of the closed end and integrally joining the shell to the plastic disk end as well as encasing the flexible caulking ring on the tongue within the groove. The heated condition of the mold will cause the plastic material to set or harden so that the half portion of the drum is formed. The mold may be separated in a manner facilitating the removal of the solidified drum portion.

In still another aspect of the invention, two half portions may be arranged with the peripheral edges of the open ends in abutting relation, and said abutting edges may be heat-sealed or otherwise secured together. Reinforcing means in the form of spiders and ribs sealed to the end heads may be provided for structural rigidity.

In still another aspect of the invention, peripherally spaced dividing strips arranged parallel with the longitudinal axis of the drum may be made of plastic material and attached or otherwise hermetically sealed to the drum periphery, forming shallow collecting pockets about the peripheral exterior of the drum, and these strips may include longitudinally extending caulking grooves therein.

In still another aspect of the invention, transversely arcuate grid elements may be held to the drum surface by flange means on the dividing strips. A cloth or screen filtering medium may cover the drum periphery, lying over the caulking grooves of the dividing strips as well as the peripheral grooves at each end of the drum. Caulking may be forced into all the caulking grooves on top of the filtering medium, securely holding it to the drum periphery.

In still another aspect of the invention, each shallow pocket on the drum periphery may have one or more ports connected to plastic tubing interiorly of the drum, each such tubing being connected to a separate port in a valve mounted in the head at one end of the drum. All of the ports of this valve may be connected to a suction means leading to a line for conveying the filtrate that passes from a tank in which the drum is mounted for rotation, thence through the periphery of the drum, depositing a filter cake on the filtering medium thereon.

The above, other objects and novel features of the invention will become apparent from the following specification and accompanying drawings which are merely exemplary.

Figure 2:
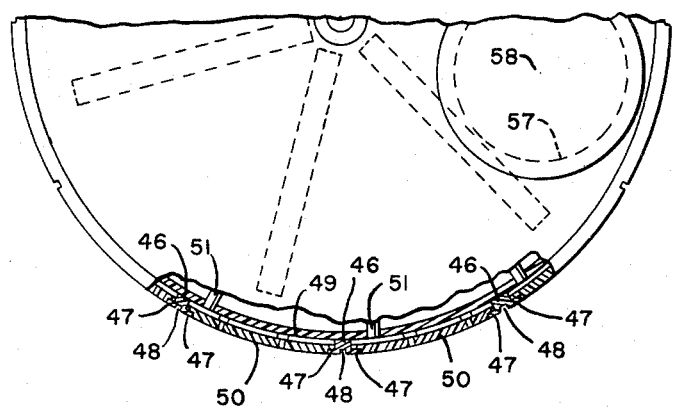
FIG. 2 is a sectional view taken substantially along line 2—2 of FIG. 1.
Figure 1:
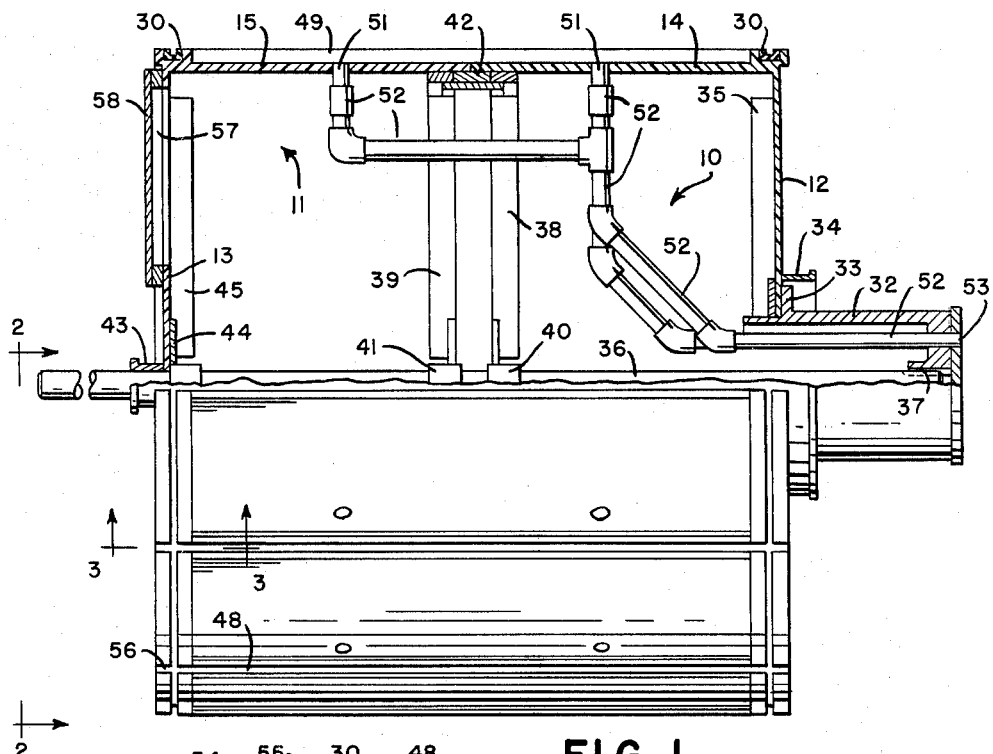
FIG. 1 is a sectional elevational view of a drum type filter to which the principles of the invention have been applied.

Referring to the drawings and particularly to FIGS. 1 and 2, the principles of the invention are shown as applied to a drum filter comprising two half portions 10 and 11, having head ends 12 and 13 that are, respectively, integral with one end of hollow cylinders 14, 15 forming a drum from the two half portions 10 and 11.

Figure 4:
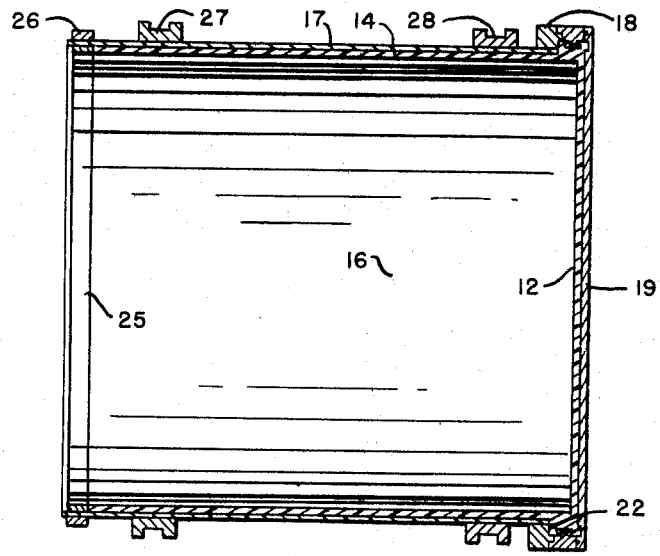
FIG. 4 is a sectional elevational view of a mold for casting one half portion of the drum of FIG. 1.
Figure 5:
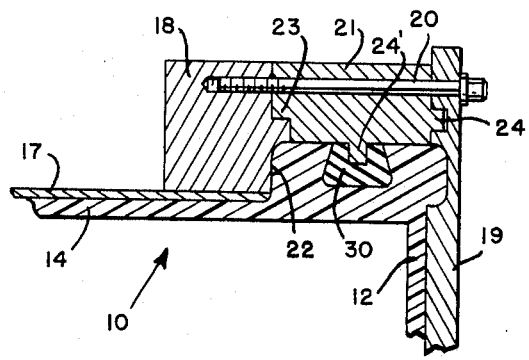
FIG. 5 is an enlarged view of a sectional portion of FIG. 4.

Referring to FIG. 4, the half portions 10, 11 may be rotatably cast in a mold 16 adapted to be mounted for rotation about a horizontal axis. The mold 16 may comprise a cylindrical sheet metal housing 17 having a ring 18 fixed to one end thereof. An end plate 19 may be fixed to the ring 18 by bolts 20, and an annular spacer block 21 may be located between the plate 19 and ring 18. The annular spacer 21 may be of greater internal diameter than that of ring 18, thereby forming an annular pocket or groove 22 between plate 19 and the end of housing 17. The spacer 21 may include interlocking seal means 23 and 24 that cooperate with ring 18 and plate 19. Furthermore, annular spacer 21 may be composed of segmental portions to facilitate removal of the cast drum half portion from the mold. It also may include a tongue 24' extending radially inwardly from spacer 21.

The housing 17 may include an internal ring 25 at its end opposite that to which plate 19 is attached. The radial thickness of ring 25 preferably is equal to or greater than the desired radial thickness of the peripheral wall of portions 14 and 15. An exterior ring 26 may also be provided for adding rigidity to the mold. Annular tracks 27 and 28 may surround the outer periphery of mold housing 17 for facilitating the rapid rotation of the mold about a horizontal axis.

A drum half portion may be produced by inserting a disk of suitable plastic material within the mold housing 17 against the end wall 19, forming the end wall 12 of portion 10. The peripheral edge of disk or end wall 12 may be roughened. A flexible annular grooved member 30 may be mounted on the tongue 24' and it may be made of rubber or other suitable flexible material.

With the mold rotating at a predetermined speed, plastic material such as a dispersion of polyvinyl chloride resin in a liquid plasticizer, having a suitable liquid consistency, may be introduced into the open end of housing 17. The rapid rotation of the mold causes centrifugal force to distribute the plastic material throughout the interior of the mold, filling groove 22 and forming a liquid joint between plastic disk 12 and the plastic material in groove 22. Additionally, a uniformly thick peripheral wall 14 of plastic material will be formed on the inner periperal surface of housing 17. Such rotary casting provides a homogeneous product devoid of bubbles. Subjecting the mold to a predetermined temperature causes the plastic material to harden, resulting in a tough, solid mass with the disk or end 12 integrally connected to the wall 14.

After the mold has cooled, bolts 20 and plate 19 as well as the segments forming annular spacer 21 are removed, and the drum half 10 is slid outwardly through the end housing 17 that is opened by the removal of plate 19. The half portion 11 may be made in the same way.

Referring again to FIG. 1, the half portion 10 may have a multi-port valve housing 32 mounted within a central hole within its head end 12 and fixed thereto by a flange 33 that is surrounded by a drip flange 34. Reinforcing members 35 of metal or plastic may be bonded or otherwise fastened to head 12, and the housing 32 may be fixed to a shaft 36 by a key 37.

Plastic or metal spiders 38, 39 may be mounted within the open ends of portions 10 and 11 and these spiders may include hubs 40, 41 mounted on shaft 36, there being a plastic ring 42 between the spiders. The arrangement may be such that half the axial width of ring 42 lies within half portion 10 and the other half receives the open end of portion 11. The peripheral edges of the cylinders 14 and 15 abut when the portions 10 and 11 are in assembled relation. A hermetic seal may then be provided between these abutting edges and ring 42. The end 13 of portion 11 may include a hub 43 fixed to it by a flange 44, and hub 43 may receive shaft 36. Radial reinforcing plastic or metal strips 45 may be bonded or otherwise attached to the head 13.

Referring again to FIGS. 1 and 2, divider strips 46 of machined or extruded plastic may be peripherally spaced about, extend longitudinally of, and be bonded or otherwise fastened to, the outer periphery of the drum 10, 11. These divider strips may include longitudinally extending flanges 47 and a caulking groove 48. From the foregoing it is evident that the divider strips 46 form longitudinally extending, peripherally spaced, shallow pockets 49 about the drum 10, 11. Arcuate grid members 50 may be held to the outer periphery of drum 10, 11 by the flanges 47 on adjacent divider strips 46. Plastic grid members 50 may include spaced buttons that support them in slightly spaced relation to the drum periphery.

Each of the shallow pockets 49 may have one or more ports 51 that connect with plastic tubing 52 leading to a port 53 in the valve housing 32.

Figure 3:
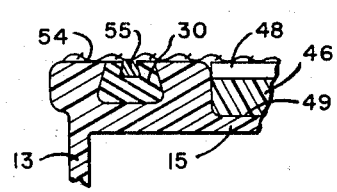
FIG. 3 is a sectional view taken substantially along line 3—3 of FIG. 1.

Referring to FIG. 1 and 3, filtering media 54 such as screen or fabric cloth may cover the shallow pockets 49 lying on top of the grids 50 and the divider strips 46. Caulking 55 may be forced into the grooves 48 on top of the media 54, which grooves may be aligned with grooves 56 extending across the juncture between the head 13 and wall 15 that includes the flexible grooved caulking strip 30. Caulking also may be forced into the grooves in strip 30 on top of the media 54, thereby securing the filtering media to the peripheral surface of the drum 10, 11.

A hole 57 in end 13 may be covered with a plate 58, the hole providing access to the interior of the drum.

Although the various features of the improved drum filter have been shown and described in detail to fully disclose one embodiment of the invention, it will be evident that changes may be made in such details and certain features may be used without others departing from the principles of the invention.

What is claimed is:

1. A drum filter comprising in combination, two plastic drum half portions of similar construction, each having one end closure integrally molded to a hollow cylinder, the open ends of said cylinders being in abutting relation to each other; seal means including sealing ring means joining the abutting edges of the open ends of said cylinders; external peripheral channel-shaped grooves extending about the periphery of each half portion adjacent the juncture between the end closure and the hollow cylinder; peripherally spaced plastic divider strips extending parallel to the longitudinal axis of said drum and bonded to its outer periphery, said divider strips extending the entire distance between said grooves and forming shallow pockets about the periphery of said drum; ports in said pockets; tubing leading from said ports to a valve housing supported by one of said end closures; arcuately shaped grid means mounted within each of said shallow pockets; means interlocking said means with the divider strips in said pockets; filter media surrounding the periphery of said drum; walls defining grooves extending longitudinally of said divider strips; and caulking means within said peripheral and longitudinally extending grooves securing said filter media to the periphery of said drum.

2. The drum filter of claim 1, wherein spider-like elements are mounted within the open end of each half portion and spaced from the ends of said open end portions, said sealing ring means being received in the space between said spider-like elements.

References Cited by the Examiner

UNITED STATES PATENTS

| | | | |
|---|---|---|---|
| 1,963,610 | 6/34 | Becraft | 210—404 X |
| 2,124,828 | 7/38 | Neil | 210—404 |
| 2,219,576 | 10/40 | Moreland | 156—69 |
| 2,238,962 | 4/41 | Young | 210—392 |
| 2,582,273 | 1/52 | Peterson et al. | 210—404 |
| 3,013,666 | 12/61 | Krynski | 210—404 |

REUBEN FRIEDMAN, *Primary Examiner.*

HERBERT L. MARTIN, *Examiner.*

UNITED STATES PATENT OFFICE
CERTIFICATE OF CORRECTION

Patent No. 3,200,951                          August 17, 1965

John E. Krynski

It is hereby certified that error appears in the above numbered patent requiring correction and that the said Letters Patent should read as corrected below.

Column 3, line 30, for "end housing" read -- end of housing --; column 4, line 21, for "others departing" read -- others without departing --; line 41, for "interlocking said means" read -- interlocking said grid means --.

Signed and sealed this 10th day of January 1967.

(SEAL)
Attest:

ERNEST W. SWIDER                                      EDWARD J. BRENNER
Attesting Officer                                          Commissioner of Patents